US008243807B2

(12) United States Patent
Yokoyama et al.

(10) Patent No.: US 8,243,807 B2
(45) Date of Patent: Aug. 14, 2012

(54) IMAGE PROCESSING METHOD, A PROGRAM OF AN IMAGE PROCESSING METHOD, A RECORDING MEDIUM ON WHICH A PROGRAM OF AN IMAGE PROCESSING METHOD IS RECORDED AND AN IMAGE PROCESSING CIRCUIT

(75) Inventors: Kazuki Yokoyama, Kanagawa (JP); Mitsuyasu Asano, Tokyo (JP); Kazuhiko Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1331 days.

(21) Appl. No.: 11/843,028

(22) Filed: Aug. 22, 2007

(65) Prior Publication Data
US 2008/0049145 A1 Feb. 28, 2008

(30) Foreign Application Priority Data
Aug. 22, 2006 (JP) .............................. P2006-224911

(51) Int. Cl.
*H04N 7/12* (2006.01)
(52) U.S. Cl. .............................. 375/240.16; 375/240.08
(58) Field of Classification Search ........................ None
See application file for complete search history.

(56) References Cited

U.S. PATENT DOCUMENTS

| 5,953,079 A * | 9/1999 | Burl et al. ...................... 348/699 |
| 6,144,405 A * | 11/2000 | Toba ........................... 348/208.4 |
| 6,211,912 B1 * | 4/2001 | Shahraray .................. 348/228.1 |
| 6,278,736 B1 * | 8/2001 | De Haan et al. .......... 375/240.16 |
| 6,757,434 B2 * | 6/2004 | Miled et al. ..................... 382/236 |
| 7,085,419 B2 * | 8/2006 | Akiyoshi et al. ............... 382/232 |
| 7,860,162 B2 * | 12/2010 | Yokomitsu et al. ....... 375/240.12 |

FOREIGN PATENT DOCUMENTS

| JP | 7-505033 | | 1/1995 |
| JP | 2006-148386 | | 6/2006 |
| JP | 2006148386 A | * | 6/2006 |
| JP | 2006-197243 | | 7/2006 |
| JP | 2006197243 A | * | 7/2006 |

* cited by examiner

*Primary Examiner* — Mehrdad Dastouri
*Assistant Examiner* — James Anderson, II
(74) *Attorney, Agent, or Firm* — Finnegan, Henderson, Farabow, Garrett & Dunner, L.L.P.

(57) ABSTRACT

An image processing method in which a video signal is processed to detect a conspicuous area which is thought that a camera person intends to shoot, the method includes the steps of: detecting a motion vector in each portion of the video signal; detecting a representative value that represents a motion in two places in an outer part of a screen; detecting a motion component caused by zooming operations from the representative value; detecting a conspicuous degree by zooming in which a motion component caused by zooming operations is detected in each portion of the video signal based on the motion component caused by zooming operations; correcting a motion vector; detecting a motion component caused by making a pan and tilt from the representative value; detecting a conspicuous degree caused by making a pan and tilt; and detecting a total conspicuous degree.

10 Claims, 8 Drawing Sheets

IMAGE PROCESSING METHOD, A PROGRAM OF AN IMAGE PROCESSING METHOD, A RECORDING MEDIUM ON WHICH A PROGRAM OF AN IMAGE PROCESSING METHOD IS RECORDED AND AN IMAGE PROCESSING CIRCUIT

CROSS REFERENCES TO RELATED APPLICATIONS

The present invention contains subject matter related to Japanese Patent Application JP 2006-224911 filed in the Japanese Patent Office on Aug. 22, 2006, the entire contents of which being incorporated herein by reference.

BACKGROUND OF THE INVENTION

1. Field of the Invention

The present invention relates to an image processing method, a program of an image processing method, a recording medium on which a program of an image processing method is recorded, and an image processing circuit, which, for example, can be used for adjusting the image quality of video signals. In the invention, motion vectors detected in the individual portions of imaging results are separated into components caused by zooming operations and components caused by making a pan and tilt, a conspicuous degree is detected that shows the probability of being a conspicuous area for each portion, and the conspicuous degree is detected in a comprehensive manner from these conspicuous degrees, thereby allowing the detection of a conspicuous area more adequately than before.

2. Description of the Related Art

Heretofore, in various schemes of image processing, a wide variety of schemes is, proposed that identifies an area (hereinafter, referred to as a conspicuous area) in which a subject that a camera person intends to shoot is captured, based on physical properties included in two dimensional video.

Here, these physical properties are color, shapes, texture, spatial frequencies and others included in two dimensional video. For example, JP-A-2006-148386 (Patent Reference 1) proposes a method in which changes in the distance to an imaging circuit are determined to detect a conspicuous area.

However, in the detection of a conspicuous area according to schemes before, there are still problems insufficiently solved in practice.

SUMMARY OF THE INVENTION

It is desirable to provide an image processing method, a program of an image processing method, a recording medium on which a program of an image processing method is recorded and an image processing circuit, which can detect a conspicuous area more adequately than before.

An embodiment of the invention is an image processing method in, which a video signal is processed to detect a conspicuous area which is thought that a camera person intends to shoot, the method including the steps of: detecting a motion vector in each portion of the video signal; detecting a representative value that represents a motion in two places in an outer part of a screen, the two places facing to each other as the center of the screen is between the two places in accordance with at least the video signal, from the motion vector detected in the step of detecting the motion vector; detecting a motion component caused by zooming operations from the representative value; detecting a conspicuous degree by zooming in which a motion component caused by zooming operations is detected in each portion of the video signal based on the motion component caused by zooming operations; correcting a motion vector in which a corresponding motion component detected in the step of detecting the conspicuous degree caused by zooming is removed from the motion vector in each portion detected in the step of detecting the motion vector; detecting a motion component caused by making a pan and tilt from the representative value; detecting a conspicuous degree caused by making a pan and tilt in which the motion component caused by making a pan and tilt is subtracted from the motion vector in each portion computed in the step of correcting the motion vector to detect a motion component caused by making a pan and tilt in each portion; and detecting a total conspicuous degree in which computed values in the step of detecting the conspicuous degree caused by zooming and in the step of detecting the conspicuous degree caused by making a pan and tilt are added in each portion to compute a conspicuous degree that indicates a probability of being the conspicuous area in each portion.

An embodiment of the invention is a program of an image processing method in which a video signal is processed to detect a conspicuous area which is thought that a camera person intends to shoot, the program of the image processing method including the steps of: detecting a motion vector in each portion of the video signal; detecting a representative value that represents a motion in two places in an outer part of a screen, the two places facing to each other as the center of the screen is between the two places in accordance with at least the video signal, from the motion vector detected in the step of detecting the motion vector; detecting a motion component caused by zooming operations from the representative value; detecting a conspicuous degree by zooming in which a motion component caused by zooming operations is detected in each portion of the video signal based on the motion component caused by zooming operations; correcting a motion vector in which a corresponding motion component detected in the step of detecting the conspicuous degree caused by zooming is removed from the motion vector in each portion detected in the step of detecting the motion vector; detecting a motion component caused by making a pan and tilt from the representative value; detecting a conspicuous degree caused by making a pan and tilt in which the motion component caused by making a pan and tilt is subtracted from the motion vector in each portion computed in the step of correcting the motion vector to detect a motion component caused by making a pan and tilt in each portion; and detecting a total conspicuous degree in which computed values in the step of detecting the conspicuous degree caused by zooming and in the step of detecting the conspicuous degree caused by making a pan and tilt are added in each portion to compute a conspicuous degree that indicates a probability of being the conspicuous area in each portion.

An embodiment of the invention is a recording medium on which a program of an image processing method is recorded in which a video signal is processed to detect a conspicuous area which is thought that a camera person intends to shoot, the image processing method including the steps of: detecting a motion vector in each portion of the video signal; detecting a representative value that represents a motion in two places in an outer part of a screen, the two places facing to each other as the center of the screen is between the two places in accordance with at least the video signal, from the motion vector detected in the step of detecting the motion vector; detecting a motion component caused by zooming operations from the representative value; detecting a conspicuous degree by zooming in which a motion component caused by zooming operations is detected in each portion of the video signal based on the motion component caused by zooming operations; correcting a motion vector in which a corresponding motion component detected in the step of detecting the conspicuous degree caused by zooming is removed from the motion vector in each portion detected in the step of detecting the motion vector; detecting a motion component caused by making a pan and tilt from the representative value; detecting a conspicuous degree caused by making a pan and tilt in which the motion component caused by making a pan and tilt is subtracted from the motion vector in each portion computed in the step of correcting the motion vector to detect a motion component caused by making a pan and tilt in each portion; and detecting a total conspicuous degree in which computed values in the step of detecting the conspicuous degree caused by zooming and in the step of detecting the conspicuous degree caused by making a pan and tilt are added in each portion to compute a conspicuous degree that indicates a probability of being the conspicuous area in each portion.

An embodiment of the invention is an image processing apparatus in which a video signal is processed to detect a conspicuous area which is thought that a camera person intends to shoot, the apparatus including: a motion vector detecting part configured to detect a motion vector in each portion of the video signal; a representative value detecting part configured to detect a representative value that represents a motion in two places in an outer part of a screen, the two places facing to each other as the center of the screen is between the two places in accordance with at least the video signal, from the motion vector detected in the step of detecting the motion vector; a detecting part of a motion component caused by zooming configured to detect a motion component caused by zooming operations from the representative value; a detecting part of a conspicuous degree caused by zooming configured to detect a motion component caused by zooming operations in each portion of the video signal based on the motion component caused by zooming operations; a motion vector correcting part configured to correct a motion vector in which a corresponding motion component detected in the step of detecting the conspicuous degree caused by zooming is removed from the motion vector in each portion detected in the step of detecting the motion vector; a detecting part of motion component caused by making a pan and tilt configured to detect a motion component caused by making a pan and tilt from the representative value; a detecting part of a conspicuous degree caused by making a pan and tilt configured to detect a conspicuous degree caused by making a pan and tilt in which the motion component caused by making a pan and tilt is subtracted from the motion vector in each portion computed in the step of correcting the motion vector to detect a motion component caused by making a pan and tilt in each portion; and a total conspicuous degree detecting part configured to detect a total conspicuous degree in which computed values in the step of detecting the conspicuous degree caused by zooming and in the step of detecting the conspicuous degree caused by making a pan and tilt are added in each portion to compute a conspicuous degree that indicates a probability of being the conspicuous area in each portion.

According to the configurations of an embodiment of the invention, even in the case in which the motion component caused by making a pan and tilt and the motion component caused by zooming operations exist together, the motion component caused by zooming operations is separated from the motion component caused by making a pan and tilt based on the representative value of the motion vector detected in the outer part of the screen, the motion component caused by zooming operations in each portion is detected from the motion component caused by zooming operations, and the detected result is used to detect the motion component caused by making a pan and tilt in each portion. Here, in the motion component caused by zooming operations in each portion that is thus detected, it can be said that the possibility of being the conspicuous area is higher as the portion is closer to the center of the screen, that is, as the portion has a smaller motion. In addition, in the motion component caused by making a pan and tilt in each portion, it can be said that the possibility of being the conspicuous area is higher in the portion the motion of the camera is more followed, that is, in the portion having a smaller motion. Accordingly, the conspicuous degree is determined that indicates the probability of being a conspicuous area from the motion component caused by zooming operations in each portion and the motion component caused by making a pan and tilt in each portion, and thus a conspicuous area can be detected more adequately than before.

According to an embodiment of the invention, a conspicuous area can be detected more adequately than before.

DETAILED DESCRIPTION OF THE INVENTION

Hereinafter, embodiments according to an embodiment of the invention will be described in detail with reference to the drawings.

Embodiment 1

1. The Configuration of the Embodiment

Figure 2:
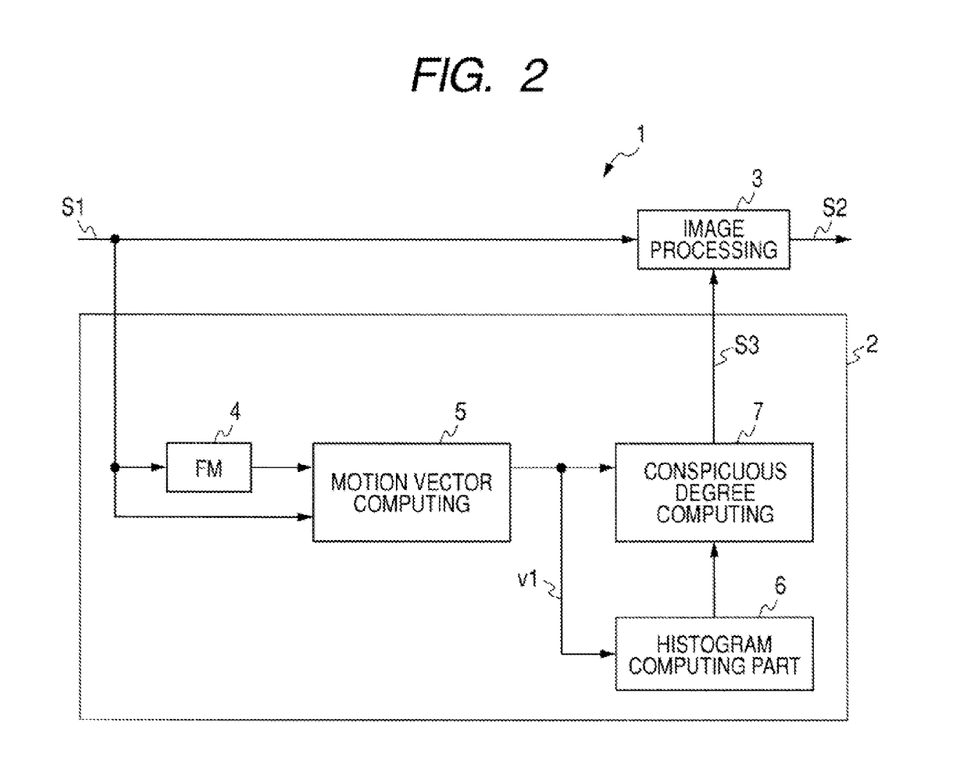
FIG. 2 shows a block diagram depicting the image processing circuit of embodiment 1 according to an embodiment of the invention.

FIG. 2 shows a block diagram depicting an image processing circuit of embodiment 1 according to an embodiment of the invention. The image processing circuit 1 detects a conspicuous area from a video signal S1 by a conspicuous area detecting part 2, subjects the video signal S1 to image processing by an image processing part 3 based on the detected result of the conspicuous area, and outputs an output signal S2. In addition here, for example, for image processing in the image processing part 3, various schemes of image processing can be widely applied such as the generation of a key signal and a mask that extract a conspicuous area, and the correction of image quality predominantly for a conspicuous area.

In the conspicuous area detecting part 2, a frame memory (FM) 4 delays the video signal S1 by a period of a single frame and outputs it, and a motion vector computing part 5 subsequent thereto receives the video signal delayed by a single frame and the original video signal S1 and detects a motion vector v1 for every pixel. In addition here, the detection of the motion vector may be performed in units of blocks for detecting motion vectors. Moreover, only a brightness signal may be used to detect the motion vector v1. Furthermore, various schemes of detecting the motion vector can be widely applied including block matching, gradient, etc.

The conspicuous area detecting part 2 uses the motion vector v1 to detect a conspicuous degree that indicates the possibility of being a conspicuous area, and determines the conspicuous degree based on a predetermined threshold to detect the conspicuous area.

Figure 3A:
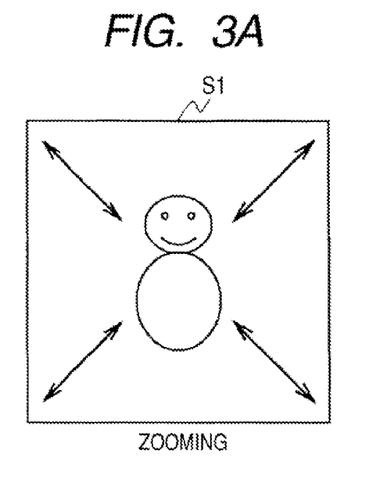
FIGS. 3A and 3B show a plan view illustrative of motion vectors in zooming operations.
Figure 3B:
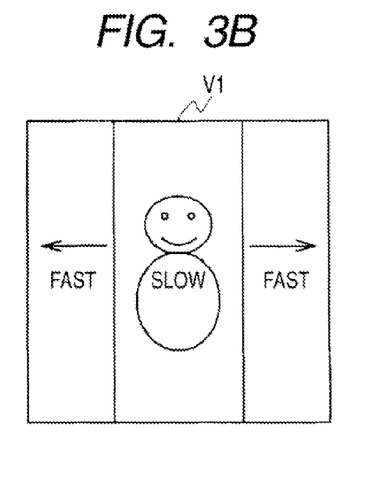

Here, as shown in FIGS. 3A and 3B, in the case in which a camera person zooms in, it is considered to be the case in which the conspicuous area is zoomed in to shoot. In this case, the conspicuous area exists in the center of the screen in the majority of cases. In this case, the motion vector becomes smaller as it is closer to the center of the screen, and the motion vector becomes greater as it is more toward the outer part of the screen. Therefore, in this case, it can be said that the possibility of being the conspicuous area is higher in the portion in which the motion vector is smaller.

In contrast to this, in the case of zooming out, in the majority of cases, the conspicuous area having been zoomed in is turned to zoom out and shoot. Also in this case, it can be said that the possibility of being the conspicuous area is higher in the portion in which the motion vector is smaller.

Figure 4A:
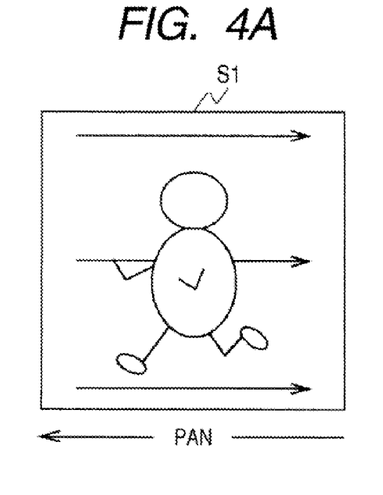
FIGS. 4A and 4B show a plan view illustrative of motion vectors in pan operations.
Figure 4B:
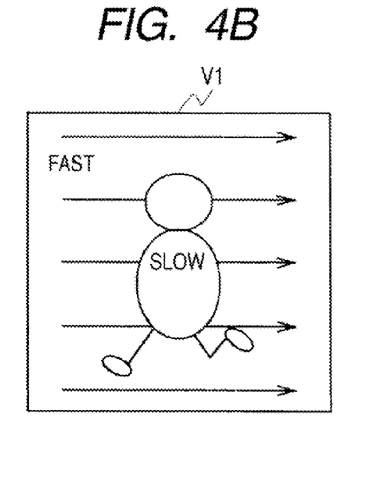
Figure 5A:
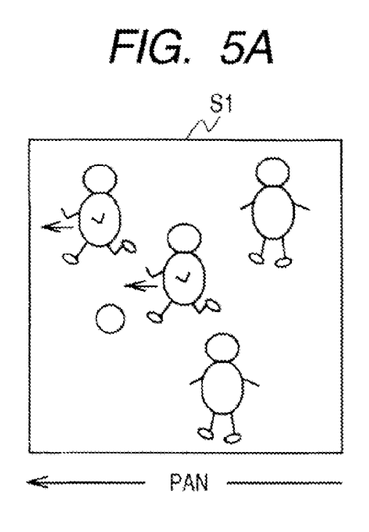
FIGS. 5A and 5B show a plan view illustrative of motion vectors in pan operations in the case in which there are a number of moving objects.
Figure 5B:
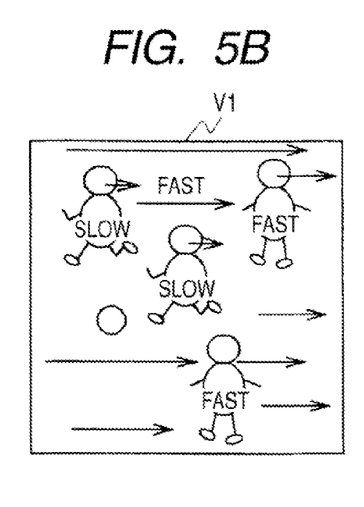

In addition, as shown in FIG. 4A, in the case in which a camera person pans a camera, it is the case in which a desired subject is tracked in the majority of cases. Therefore in this case, in the imaging result, it can be said that the possibility of being the conspicuous area is higher in the area which moves as the motion of the camera is followed. As shown in FIG. 4B, it can be said that the possibility of being the conspicuous area is higher in the portion in which the amount of movement is smaller. Thus, the magnitude of the motion vector is used to express the conspicuous degree that indicates the possibility of being the conspicuous area. As shown in FIGS. 5A and 5B, this is also applied to the case in which people are in a screen frame. Also in this case, the magnitude of the absolute value of the motion vector is used to express the conspicuous degree.

On this account, also in the case in which a camera is tilted, it can be said that the possibility of being the conspicuous area is higher in the portion in which the amount of movement is smaller, and the magnitude of the absolute value of the motion vector is used to express the conspicuous degree.

Accordingly, in the case in which no zooming operation is performed, the conspicuous degree can be detected from the magnitude of the relative motion with respect to the background, whereas for the zooming operation, the conspicuous degree can be expressed by the distance from the center of the screen.

However, in the actual imaging result, the pan, tilt and zooming operations are sometimes combined. Therefore, it is necessary to determine the conspicuous degree with no distinction depending on the existence of the zooming operation. Then, in the embodiment, attention is given to that the outer part of the screen is highly unlikely to be the conspicuous area, and the conspicuous degree is detected with reference to the motion vector v1 detected in the outer part of the screen.

Figure 6:
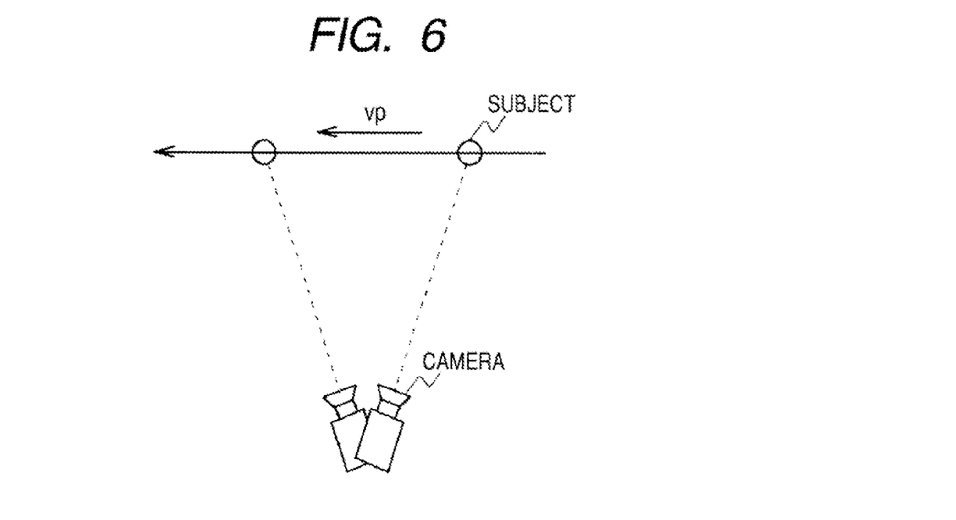
FIG. 6 shows a schematic diagram illustrative of a premise in pan operations.

Here, as shown in FIG. 6, it is supposed that a subject moves at a constant velocity in front of a still background and a camera simply pans as it follows the subject. In this case, in the case in which the motion of the camera is equivalent to a motion vector vp, as shown in FIG. 6, in the imaging result, a motion vector −vp that corresponds to the motion of the camera is detected on the background. Here, suppose the motion vector is v1L that is detected in a certain area at the left end of the screen, the motion vector is v1R that is detected in a certain area at the right end of the screen, and the motion vector on the background is vppan. As expressed by the following equation, the motion vector on the background can be expressed by vppan from the average value of the motion vectors v1L and v1R.

$$vppan = \frac{v1L + v1R}{2} \quad (1)$$

Figure 7A:
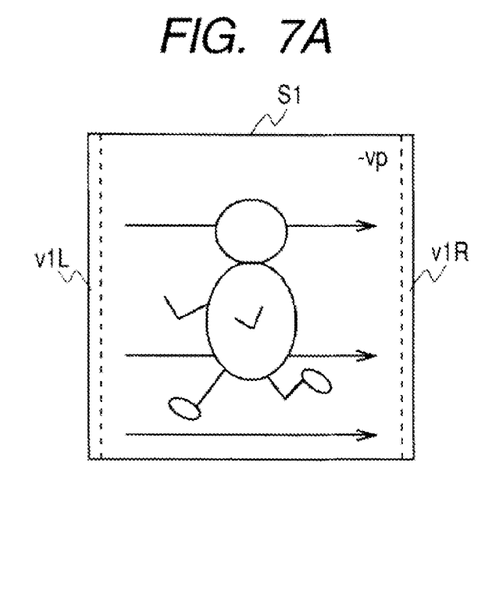
FIGS. 7A and 7B show a plan view illustrative of the conspicuous degree in pan operations.
Figure 7B:
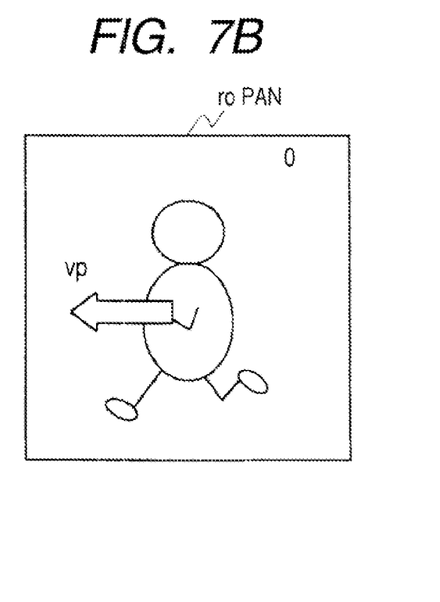

Here, the relative motion vector with respect to the background is expressed, and then, as shown in FIG. 7B, in this case, the motion vector vp is detected in the conspicuous area. Then, in the embodiment, as for panning, the magnitude of the relative motion vector with respect to the background is defined as the conspicuous degree, and a conspicuous degree ro pan is defined for every pixel in accordance with the definition as expressed by the following equation.

$$ro\ pan = |motion\ vector\ v1\ for\ every\ pixel - vppan| \quad (2)$$

In contrast to this, the same thing can be applied to the case of a tilt, and similarly, the motion vector v1 for every pixel is processed to detect the conspicuous degree. In addition, in this case, instead of the motion vectors v1L and v1R detected in a certain area at the left end of the screen and a certain area at the right end of the screen, respectively, motion vectors detected in a certain area at the upper end of the screen and in a certain area at the lower end of the screen, respectively, may be used.

Figure 8:
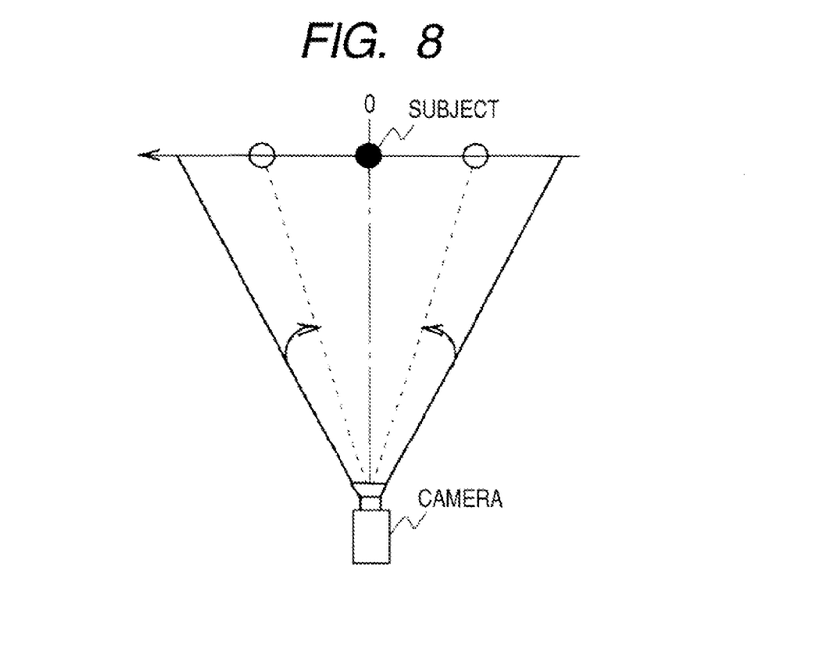
FIG. 8 shows a schematic diagram illustrative of a premise in zooming operations.
Figure 9A:
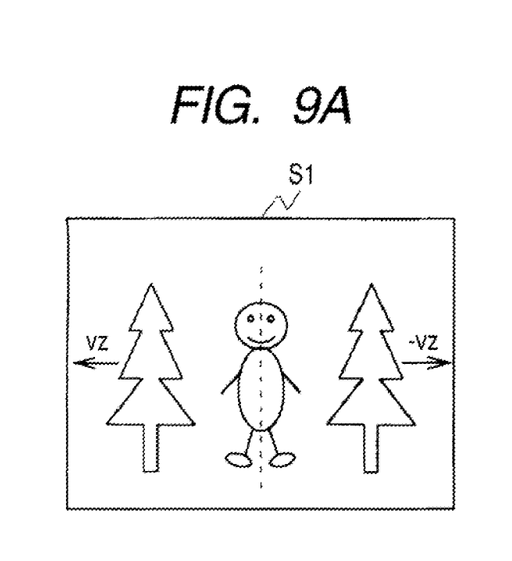
FIGS. 9A to 9C show a plan view illustrative of the conspicuous degree in zooming operations.

In contrast to this, as shown in FIG. 8, in the case in which a camera simply zooms, motion vectors vz and −vz are detected that have a value corresponding to the zoom velocity and the signs are different, from the left end area and the right end area of the imaging result as shown in FIG. 9A. In addition here, in the discussion with FIGS. 9A to 9C, for the sake of simplified description, only vectors in the horizontal direction will be described. Here, the motion vectors vz and −vz detected at the left end and the right end express the zoom velocity with reference to both ends of the screen. Therefore, as expressed by the following equation, the absolute value of the motion vectors vz and −vz is a motion vector vzoom caused by zooming.

$$vzoom = |vz| \quad (3)$$

Figure 9B:
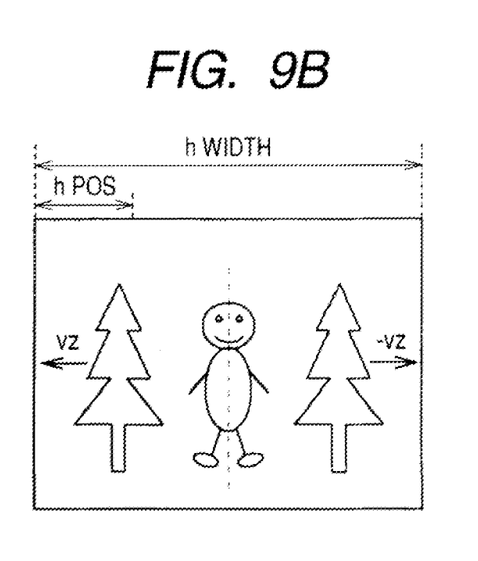
Figure 9C:
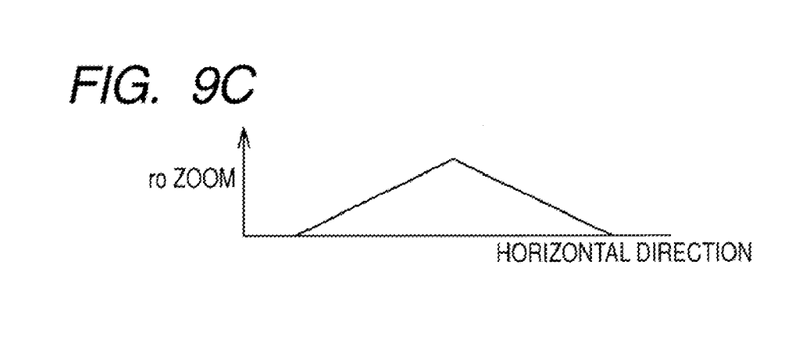

In this case, since the area is more probably the conspicuous area as closer to the center of the screen, the conspicuous degree ro zoom for every pixel caused by zooming is defined by interpolation in which a position on the screen is a variable. More specifically, in the embodiment, linear interpolation is applied to interpolation. As shown in FIGS. 9B and 9C, the conspicuous degree ro zoom at the portion h is expressed by the following equation, if h width/2≧h pos, where the breadth of the screen is h width and the distance from the left end of the screen is h pos.

$$ro\ zoom = vzoom \times \frac{h\ pos}{h\ width/2} \quad (4)$$

In addition, the conspicuous degree ro zoom is expressed by the following equation, if h width/2<h pos.

$$ro\ zoom = vzoom \times \left(1 - \frac{h\ pos}{h\ width/2}\right) \quad (5)$$

In addition here, for interpolation in which the conspicuous degree ro zoom is computed, various interpolations can be applied, not restricted to linear interpolation. For example, this scheme may be performed in which the distance from the center of the screen is set to a variable, and a curve of the second order is used for interpolation to compute the conspicuous degree ro zoom.

Figure 10:
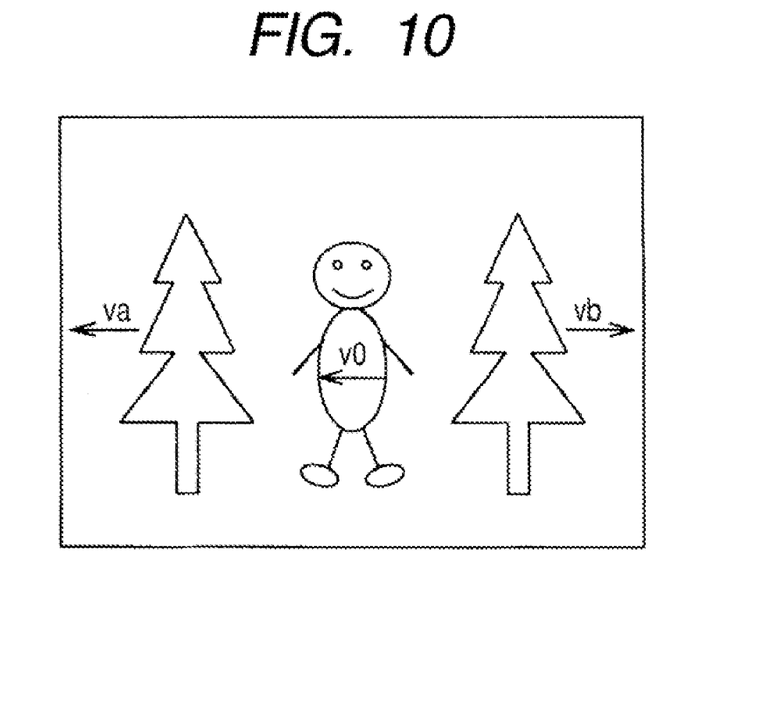
FIG. 10 shows a plan view depicting motion vectors in an actual imaging result.

In practice, it is difficult to operate a camera as closely following the motion of a subject on the basis of the definitions for the conspicuous degrees ro pan and ro zoom from equations 1 to 5. In addition, in the embodiment, in the actual imaging result, as shown in FIG. 10, the zooming process is combined with the pan and tilt operations to detect the conspicuous degree as described below. In addition here, FIG. 10 shows the case in which motion vectors va and vb are detected at the left end and the right end of the screen and a motion vector vc is detected in the center of the screen.

In other words, in the conspicuous area detecting part 2, the histogram computing part 6 receives the motion vector v1 detected in the motion vector computing part 5, and selectively uses the motion vector v1 in the outer part of the screen to compute the histogram in units of frames. Moreover, it detects the motion vector having the largest distribution from the computed histogram, sets the vector to the representative value of the motion vector v1, and notifies the conspicuous degree computing part 7 about the representative value. Thus, the histogram computing part 6 detects the motion vector in the outer part of the screen from the video signal S1, and notifies the conspicuous degree computing part 7.

Figure 11:
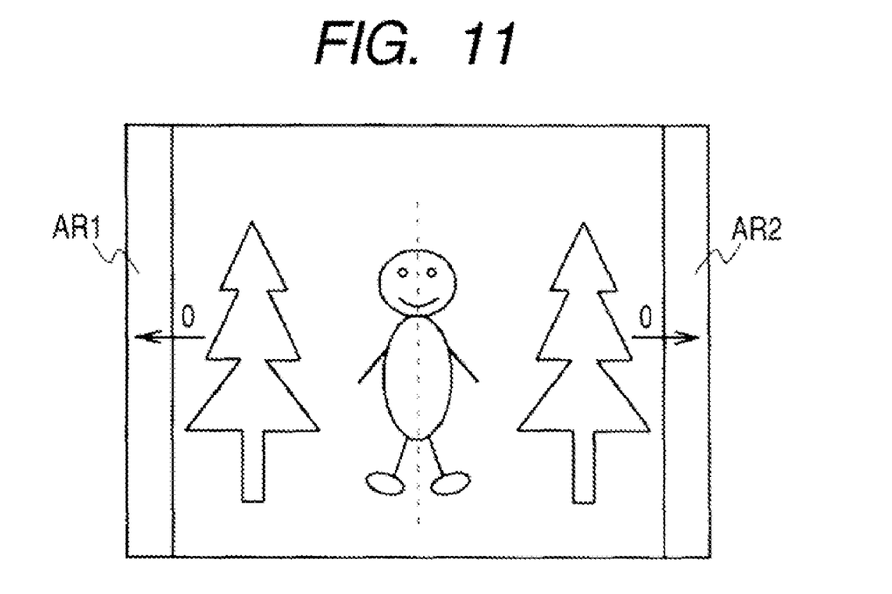
FIG. 11 shows a plan view depicting a detection area for a representative value.

More specifically, in the embodiment, as shown in FIG. 11, the histogram of the motion vector v1 is computed in an area AR1 having a certain width at the left end of the screen and an area AR2 having a certain width at the right end of the screen, and the motion vector having the largest distribution in each area is set to the representative value. In addition, for the representative value, motion vectors selected from various processes may be applied as long as the motion vector expresses the motion at the right and left ends of the screen. For example, the average value of the motion vector v1 in each area may be applied, or the weighted average value of the average value and the motion vector having the largest distribution may be applied. Moreover, instead of the areas having a certain width at the right and left ends of the screen, the representative value may be detected in areas having a certain width at the upper and lower ends, or the representative value may be detected in two corner portions in the diagonal direction facing to each other among four corners of the screen.

The conspicuous degree computing part 7 uses the representative value determined in the histogram computing part 6, and processes the motion vector v1 for every pixel to compute the conspicuous degree for every pixel. In addition, it determines the conspicuous degree based on the threshold suited for the process of the image processing part 3, generates a conspicuous area signal S3 that indicates whether to be a conspicuous area, and outputs the conspicuous area signal S3 as the detected result of the conspicuous area to the image processing part 3.

Figure 1:
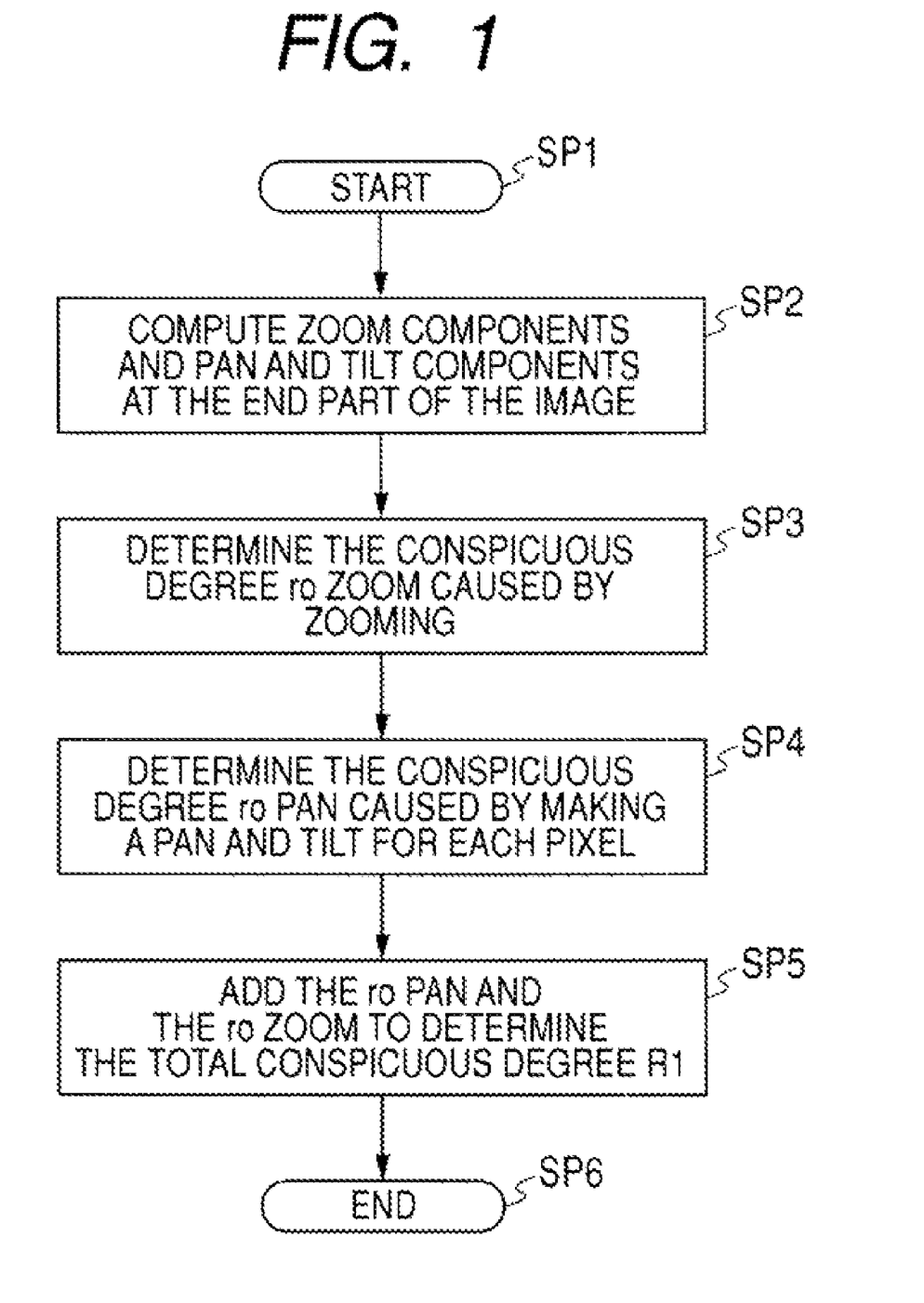
FIG. 1 shows a flow chart depicting the process steps of an image processing circuit of embodiment 1 according to an embodiment of the invention.

Here, FIG. 1 shows a flow chart depicting the process steps done by the conspicuous degree computing part 7. The conspicuous degree computing part 7 performs the process steps shown in FIG. 1 for every frame of the video signal S1. In other words, when the conspicuous degree computing part 7 acquires the representative value for each portion by a single frame from the histogram computing part 6, it starts the process steps, and goes from Step SP1 to Step SP2. Here, the conspicuous degree computing part 7 separates the acquired representative value for each portion of the screen into components caused by zooming and components caused by making a pan and tilt.

Here, the motion vectors va and vb detected from the background shown in FIG. 11 can be expressed by the following equation with the use of the motion vector on the background vp caused by making a pan and tilt and the motion vector vz in the end part caused by zooming as described above.

$$va = vp + vz + \alpha 1$$

$$vb = vp + vz + \alpha 2 \quad (6)$$

In addition here, α1 and α2 are components caused by fluctuations and variations on the background, but α1 and α2 can be regarded as value 0 by determining the representative value in the histogram computing part 6. Then, α1 and α2 are regarded as nearly value 0, the equation 6 is solved for the vectors vp and vz, and then the relation between the following equations can be obtained.

$$vp \cong \frac{va + vp}{2} \quad (7\text{-}1)$$

$$vz \cong \frac{va - vp}{2} \quad (7\text{-}2)$$

The conspicuous degree computing part 7 uses the equation 7-1 to average the representative values of the motion vectors detected in each portion, and detects the in-phase component of the representative values to detect the motion vector on the background vp caused by making a pan and tilt. In addition, it uses the equation 7-1 to process the representative values of the motion vectors detected in each portion, and detects the antiphase component of the representative values to detect the motion vector vz in the end part caused by zooming.

Subsequently, the conspicuous degree computing part 7 goes to Step SP3, uses the motion vector vz caused by zooming at the end part detected in Step SP2, and computes the conspicuous degree ro zoom for every pixel caused by zooming. In addition here, r is the distance from the center of the screen for every pixel.

$$ro\ zoom = |vz| \times \left(1 - \frac{r}{h\ width/2}\right) \quad (8)$$

At the same time, the conspicuous degree computing part 7 computes the following equation, and detects the motion component of the motion vector v1 caused by zooming operations detected for every pixel. In addition, in the following equation, components in the X-direction and components in the Y-direction for each value are indicated by the suffix of the signs x and y. Therefore, the conspicuous degree computing part 7 linearly interpolates the motion caused by zooming operations detected at the right and left ends of the screen for each of the components in the X-direction and the components in the Y-direction in accordance with the distance from the center of the screen in the X-direction and in the Y-direction by computing Equation 9, and computes the motion caused by zooming operations for every pixel.

$$v1zoom_x = vz_x\left(\frac{r_x}{h\ \text{width}/2}\right)$$
$$v1zoom_y = vz_y\left(\frac{r_y}{h\ \text{width}/2}\right) \quad (9)$$

In addition, the computation of the equation 8 is a computation that combines the computation of the equation 9 with the computation in which the motion vector v1 zoom determined by the equation 9 is subtracted from the motion vector vz at the end part to obtain the absolute value. Therefore, in the process in Step SP3, this scheme may be performed in which instead of directly determining the conspicuous degree ro zoom caused by zooming operations through the computation of the Equation 8, the vector v1 zoom (v1 zoom$_x$, v1 zoom$_y$) caused by zooming operations for every pixel determined through the computation of the Equation 9 is subtracted from the motion vector vz caused by zooming operations detected at the end part to obtain the absolute value, and the conspicuous degree ro zoom caused by zooming is computed for every pixel by computing the equation 8.

Subsequently, the conspicuous degree computing part 7 goes to Step SP4, and subtracts the vector v1 zoom (v1 zoom$_x$, v1 zoom$_y$) for every pixel determined in Step SP3 from the corresponding motion vector v1 for every pixel through the computation of the following equation to compute the motion vector v0 for every pixel caused by making a pan and tilt. Accordingly, in the embodiment, the motion vector v1 detected in each portion is separated into the motion component caused by zooming operations and the motion component caused by making a pan and tilt to detect the conspicuous degree for the both components. In addition, in this case, this scheme may be performed in which the computation of the equation 8 is performed for each of the components in the X-direction and the components in the Y-direction, the vectors obtained from the computed components in the X-direction and the components in the Y-direction are added to the corresponding motion vector v1 for every pixel, and the motion vector v0 caused by making a pan and tilt is computed for every pixel. In addition, in the computation of the equation 9, instead of linear interpolation, an interpolation based on the curve of the second order may be applied. Moreover, this scheme may be performed in which the X-component and the Y-component are weighted to detect the conspicuous degree, and changes in the conspicuous degree with respect to the motion in each portion are varied by the pan operations and the tilt operations. In addition here, instead of a simple addition of the conspicuous degrees ro zoom and ro pan, the total conspicuous degree may be computed by weighted addition, and the weighting factor in weighted addition may be switched depending on the shooting mode.

$$v0 = v1 - v1\ zoom \quad (10)$$

In addition, the motion vector v0 computed for every pixel and the motion vector on the background vp caused by making a pan and tilt computed with the equation 7-1 are used to compute the following equation, and the conspicuous degree ro pan caused by making a pan and tilt is computed.

$$ro\text{pan} = |v0\ vp| \quad (11)$$

Subsequently, the conspicuous degree computing part 7 goes to Step SP5, adds the conspicuous degrees ro zoom and ro pan computed in Step SP3 and Step SP4 for every pixel to compute a total conspicuous degree R1, and goes to Step SP6 to end the process steps.

The conspicuous degree computing part 7 turns the computed conspicuous degree r1 to the absolute value, determines it based on a predetermined threshold, and then generates the conspicuous area signal S3.

2. The Operation of the Embodiment

In the configuration described above, in the image processing circuit 1 (FIG. 2), the motion vector v1 in each portion of the video signal S1 is detected in the motion vector computing part 5 in units of pixels. In the histogram computing part 6, for the video signal S1, the representative value is detected that represents the motions in the areas AR1 and AR2 from the motion vector v1 detected in the areas AR1 and AR2 (FIG. 11) at the left end and at the right end facing to each other as the center of the screen is between them. Here, it can be said that the motion vectors that represent the motions in the area AR1 at the left end and the area AR2 at the right end are highly likely to be the background, and it can be said that the possibility of being the conspicuous area is higher in the portion having a smaller motion among the motion vectors v1 detected in each portion in the case of making a pan and tilt. In addition, in the case of zooming, it can be said that the possibility of being the conspicuous area is higher in the portion closer to the center of the screen. However, in the actual imaging result, since the pan, tilt and zooming operations are combined, it is likely to detect a wrong conspicuous area when the center of the screen and the portion having a small motion are simply set to a conspicuous area.

Then, in the embodiment, the motion component caused by zooming operations and the motion component caused by making a pan and tilt are detected from the representative values detected at the left end and the right end (Step SP2 in FIG. 1).

Moreover, the motion component caused by zooming operations is used to detect the motion caused by zooming operations in each portion of the video signal S1, and the conspicuous degree caused by zooming operations is detected (Step SP3 in FIG. 1).

In addition, the motion component caused by zooming operations is removed of the motion vector v1 detected in each portion based on the motion caused by zooming operations in each portion, and then the conspicuous degree caused by making a pan and tilt is detected based on the relative amount of movement to the motion component caused by making a pan and tilt detected from the representative value. Moreover, the conspicuous degree caused by making a pan and tilt is added to the conspicuous degree caused by zooming operations to detect the total conspicuous degree, and the total conspicuous degree is determined based on the threshold to generate the conspicuous area signal S3 that indicates whether to be a conspicuous area. In the image processing circuit 1, the video signal S1 is subjected to image processing based on the conspicuous area signal S3.

Accordingly, in the image processing circuit 1, even in the case in which it is difficult to detect a conspicuous area depending on color, shapes, texture, spatial frequencies and others included in two dimensional video, the motion vector is used to detect a conspicuous area, and a conspicuous area can be detected more adequately than before. In addition, at this time, the motion vector detected in each portion of the imaging result is separated into the component caused by zooming operations and the component caused by making a pan and tilt to detect the conspicuous degree for components in each area, and the conspicuous degree is detected in a comprehensive manner, whereby a conspicuous area can be detected more adequately than before.

More specifically, in the embodiment, a histogram is generated for each area in which the representative value is detected in the histogram computing part 6, and the motion vector having the largest distribution in the histogram is set to the representative value. Therefore, for example, as shown in FIGS. 5A and 5B, even in the case in which there are a large number of moving objects on the screen and a part of them exist in the area in which the representative value is detected, and furthermore, for example, in the case in which leaves on trees on the background move in the wind, the motion on the background can be reliably detected from these areas, whereby the detection accuracy of the conspicuous area can be improved.

In addition, the antiphase component is detected from the representative value to detect the motion component caused by zooming operations, as well as the in-phase component is detected from the representative value to detect the motion component caused by making a pan and tilt, whereby the motion component caused by zooming operations and the motion component caused by making a pan and tilt are detected through a simple computation, and a conspicuous area can be detected more adequately than before with a simple configuration as a whole.

Moreover, the motion component caused by zooming operations in each portion is detected by interpolation in which the position on the screen is the variable with reference to the motion in the outer part of the screen detected from the representative value, whereby the motion caused by zooming operations in each portion is detected with simple operations, and a conspicuous area can be detected more adequately than before with a simple configuration as a whole.

3. The Advantage of the Embodiment

According to the configuration above, the motion vector detected in each portion of the imaging result is separated into the component caused by zooming operations and the component caused by making a pan and tilt to detect the conspicuous degree that indicates the probability of being a conspicuous area for the components in each area, and the conspicuous degree is detected from the conspicuous degree in a comprehensive manner, whereby a conspicuous area can be detected more adequately than before.

In addition, a histogram is generated for each area in which the representative value is detected, and the motion vector having the largest distribution in the histogram is set to the representative value, whereby the motion on the background is reliably detected to improve the detection accuracy of the conspicuous area.

Moreover, the antiphase component is detected from the representative value to detect the motion component caused by zooming operations, and/or the in-phase component is detected from the representative value to detect the motion component caused by making a pan and tilt, whereby the motion component caused by zooming operations and the motion component caused by making a pan and tilt can be detected through a simple computation, and a conspicuous area can be correspondingly detected more adequately than before with a simple configuration as a whole.

Furthermore, the motion component caused by zooming operations in each portion is detected by interpolation in which the position on the screen is the variable with reference to the motion in the outer part of the screen detected from the representative value, whereby the motion caused by zooming operations in each portion is detected by simple operations, and a conspicuous area can be correspondingly detected more adequately than before with a simple configuration as a whole.

Embodiment 2

Figure 12:
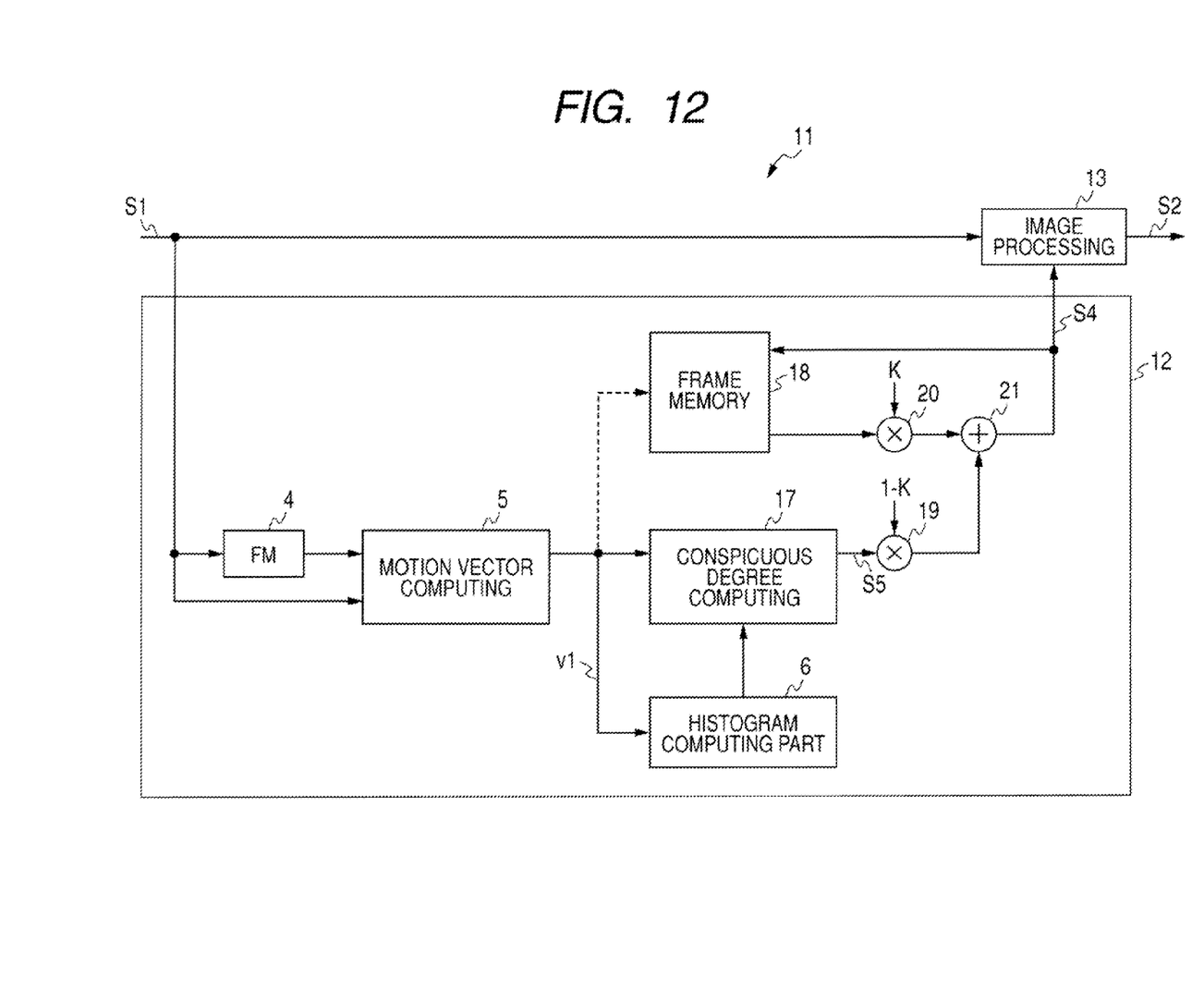
FIG. 12 shows a block diagram depicting an image processing circuit of embodiment 2 according to an embodiment of the invention.

FIG. 12 shows a block diagram depicting an image processing circuit of embodiment 2 according to an embodiment of the invention in contrast with FIG. 2. In an image processing circuit 11, the same configuration as that of the image processing circuit 1 described in FIG. 2 is designated the corresponding numerals and sings, omitting the overlapping descriptions.

In the image processing circuit 11, a conspicuous area detecting part 12 detects a conspicuous degree S4 of a video signal S1, and the conspicuous degree S4 is determined based on a threshold on an image processing part 13 side to generate a conspicuous area signal. The image processing part 13 subjects the video signal S1 to image processing based on the conspicuous area signal as similar to the image processing part 3 described in the embodiment 1.

In addition, as similar to the description in the embodiment 1, the conspicuous area detecting part 12 uses a representative value determined in a histogram computing part 6 to process a motion vector v1, and detects a conspicuous degree S5. A conspicuous degree computing part 17 is configured the same as the conspicuous degree computing part 7 in the embodiment 1 except that the conspicuous degree S5 is outputted directly.

The conspicuous area detecting part 12 delays the conspicuous degree S4 that is to be outputted to the image processing part 13 by a period of a single frame through a frame memory 18. Moreover, it weights and adds the conspicuous degree S4 delayed by a single frame to the conspicuous degree S5 outputted from the conspicuous degree computing part 17 by means of multiplication circuits 19 and 20, and an addition circuit 21, and generates the conspicuous degree S4. Thus, the conspicuous area detecting part 12 smoothes and outputs the conspicuous degree to stabilize the detection of the conspicuous area. In addition, as depicted by a dotted line in FIG. 12, this scheme may be performed in which the frame memory 18 is addressed with reference to the motion vector v1 determined in the motion vector computing part 5 to correct the motion for the conspicuous degree S4 stored in the frame memory 18, and the conspicuous degree is smoothed for every moving portion or every background. With this scheme, the conspicuous degree is weighted with the value of the corresponding position prior to moving in a frame a single frame before, whereby the conspicuous degree is smoothed more accurately to improve the detection accuracy.

Moreover, for example, this scheme may be performed in which weighting factors 1-K and K in the conspicuous area detecting part 12 are switched depending on the shooting mode such as scenic mode, portrait mode, and sports mode to vary the time constant for smoothing. More specifically, for example, the time constant is made long in the scenic mode and portrait mode, whereas the time constant is made short in the sports mode.

According to the embodiment, the conspicuous degree is smoothed and outputted, whereby the detection of the conspicuous area can be stabilized.

Embodiment 3

In addition, in the embodiments described above, the case is described in which the motion vector is simply used to detect the conspicuous area, but an embodiment of the invention is not restricted thereto. This scheme may be performed in which such a configuration is provided that a change in a scene is detected to stop detecting the motion vector, and a change in a scene is detected to hold the conspicuous degree at a value a single frame before. With this scheme, the conspicuous degree can be detected stably with no influence of the absence of the motion vector caused by finishing the operation of a camera, for example.

Moreover, in the embodiments described above, the case is described in which the motion vector is simply used to detect the conspicuous area, but an embodiment of the invention is not restricted thereto. This scheme may be performed in which the physical properties such as color, shapes, texture, spatial frequencies and others included in two dimensional video are used to combine a technique of detecting the conspicuous area to detect the conspicuous area. In addition in this case, in the case in which the OR operation of the conspicuous area signal detected by each technique generates the overall conspicuous area signal, for example, various configurations can be applied for the combinations of these techniques. In addition, the detection technique of the conspicuous area may be switched depending on the shooting mode. Furthermore, this scheme may be performed in which the conspicuous degrees detected by the individual techniques are weighted and added to combine these techniques, and the weighting factors are switched depending on the shooting mode.

In addition, in the embodiments described above, the case is described in which the video signal is subjected to image processing, but an embodiment of the invention is not restricted thereto. It can be widely adapted to the case in which the conspicuous area is detected for focus control.

An embodiment of the invention can be used for adjusting image quality of video signals, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented method, comprising:
   identifying motion vectors associated with a plurality of portions of a video signal;
   identifying, for the video signal, at least two boundary portions that correspond to an outer part of a screen, the boundary portions facing each other and being disposed such that a center of the screen is between the boundary portions;
   generating, using a processor, a value representative of at least one of a zooming motion or a pan and tilt motion within the boundary portions, the representative value being based on at least the detected motion vectors associated with corresponding ones of the boundary portions, wherein generating the representative value comprises:
      generating a histogram of the motion vectors of the boundary portions;
      identifying a motion vector within the histogram having a largest distribution; and
      establishing the identified motion vector as the representative value;
   obtaining, based on the representative value, a first motion component caused by zooming operations within the boundary portions;
   computing, based on the at first motion component, a first conspicuous degree associated with zooming operations;
   generating, based on the first motion component, modified motion vectors for the video signal portions, the modified motion vectors correcting for zooming operations within the boundary portions;
   obtaining, based on the representative value, a second motion component caused by pan and tilt operations within the boundary portions;
   computing, based on the second motion component and the modified motion vectors, a second conspicuous degree associated with pan and tilt operations; and
   determining a total conspicuous degree for the video signal potions based on a sum of the first and second conspicuous degrees, the total conspicuous degree being indicative of a probability that a conspicuous area is disposed within corresponding ones of the video signal portions.

2. The method of claim 1, wherein the first motion component corresponds to an antiphase component of the representative value.

3. The method of claim 1, wherein the second motion component corresponds to an in-phase component of the representative value.

4. The method of claim 1, wherein computing the first conspicuous degree comprises interpolating the first motion component across variable screen positions within the video signal portions.

5. The method of claim 1, further comprising applying a smoothing process to the first and second conspicuous degrees to determine the total conspicuous degree.

6. A tangible, non-transitory computer-readable medium storing instructions that, when executed by at least one processor, cause the processor to perform a method, comprising:
   identifying motion vectors associated with a plurality of portions of a video signal;
   identifying, for the video signal, at least two boundary portions that correspond to an outer part of a screen, the boundary portions facing each other and being disposed such that a center of the screen is between the boundary portions;
   generating a value representative of at least one of a zooming motion or a pan and tilt motion within the boundary portions, the representative value being based on at least the detected motion vectors associated with corresponding ones of the boundary portions, wherein generating the representative value comprises:
      generating a histogram of the motion vectors of the boundary portions;
      identifying a motion vector within the histogram having a largest distribution; and
      establishing the identified motion vector as the representative value;
   obtaining, based on the representative value, a first motion component caused by zooming operations within the boundary portions;
   computing, based on the first motion component, a first conspicuous degree associated with zooming operations;
   generating, based on the first motion component, modified motion vectors for the video signal portions, the modified motion vectors correcting for zooming operations within the boundary portions;
   obtaining, based on the representative value, a second motion component caused by pan and tilt operations within the boundary portions;
   computing, based on the second motion component and the modified motion vectors, a second conspicuous degree associated with pan and tilt operations; and determining a total conspicuous degree for the video signal potions based on a sum of the first and second conspicuous degrees, the total conspicuous degree being indicative of a probability that a conspicuous area is disposed within corresponding ones of the video signal portions.

7. An image processing apparatus, comprising:
a motion vector detecting part configured to:
   identify motion vectors associated with a plurality of portions of a video signal; and
   identify, for the video signal, at least two boundary portions that correspond to an outer part of a screen, boundary portions facing each other and being disposed such that a center of the screen is between the boundary portions;
a representative value detecting part configured to generate a value representative of at least one of a zooming motion or a pan and tilt motion within the boundary portions, the representative value being based on at least the detected motion vectors associated with corresponding ones of the boundary portions, wherein the representative value detecting part is further configured to:
   generate a histogram of the motion vectors of the boundary portions;
   identify a motion vector within the histogram having a largest distribution; and
   establish the identified motion vector as the representative Value;
a first motion component detecting part configured to obtain, based on the representative value, a first motion component caused by zooming operations within the boundary portions;
a first conspicuous degree detecting configured to compute, based on the first motion component, a first conspicuous degree associated with zooming operations;
a motion vector correcting part configured to generate, based on the first motion component, modified motion vectors for the video signal portions, the modified motion vectors correcting for zooming operations within the boundary portions;
a second motion component detecting part configured to obtain, based on the representative value, a second motion component caused by pan and tilt operations within the boundary portions;
a second conspicuous degree detecting part configured to compute, based on the second motion component and the modified motion vectors, a second conspicuous degree associated with pan and tilt operations; and
a total conspicuous degree detecting part configured to determine a total conspicuous degree for the video signal potions based on a sum of the first and second conspicuous degrees the total conspicuous degree being indicative of a probability that a conspicuous area is disposed within corresponding ones of the video signal portions.

8. An apparatus, comprising:
a storage device; and
at least one processor coupled to the storage device, wherein the storage device stores a program for controlling the at least one processor, and wherein the at least one processor, being operative with the program, is configured to:
   identify motion vectors associated with a plurality of portions of a video signal;
   identify, for the video signal, at least two boundary portions that correspond to an outer part of a screen;
   generate a value representative of at least one of a zooming motion or a pan and tilt motion within the boundary portions, the representative value being based on at least the identified motion vectors associated with corresponding ones of the boundary portions, wherein the processor is further configured to:
      generate a histogram of the motion vectors of the boundary portions;
      identify a motion vector within the histogram having a largest distribution; and
      establish the identified motion vector as the representative value;
   obtain, based on the representative value, at least one first motion component caused by zooming operations within the boundary portions, and at least one second motion component caused by pan and tilt operations within the boundary portions;
   compute, based on the first and second motion components, a first conspicuous degree associated with zooming operations and a second conspicuous degree associated with pan and tilt operations; and
   determine a total conspicuous degree for the video signal potions based on a sum of the first and second conspicuous degrees, the total conspicuous degree being indicative of a probability that a conspicuous area is disposed within corresponding ones of the video signal portions.

9. The method of claim 1, wherein determining the modified motion vectors comprises subtracting the first motion component from corresponding ones of the identified motion vectors.

10. The method of claim 1, wherein computing the second conspicuous degree comprises subtracting the second motion component from corresponding ones of the modified motion vectors.

* * * * *